United States Patent [19]

Jensen

[11] Patent Number: 5,335,403
[45] Date of Patent: Aug. 9, 1994

[54] METHOD FOR MAKING AN ELASTOMERIC SPRING ASSEMBLY

[75] Inventor: Erik D. Jensen, Batavia, Ill.

[73] Assignee: Miner Enterprises, Inc., Geneva, Ill.

[21] Appl. No.: 85,383

[22] Filed: Jul. 2, 1993

[51] Int. Cl.$^5$ .............................................. B21F 35/00
[52] U.S. Cl. ................................. 29/173; 264/261; 264/273; 29/281.5
[58] Field of Search ............... 29/173, 281.5; 267/153, 267/292; 264/273, 261

[56] References Cited

U.S. PATENT DOCUMENTS

| | | | |
|---|---|---|---|
| 2,086,992 | 7/1937 | Weber | 29/173 |
| 4,198,037 | 4/1980 | Anderson | 267/153 |
| 4,566,678 | 1/1986 | Anderson | 267/141.1 |
| 4,938,046 | 7/1990 | Kodama et al. | 29/173 |

FOREIGN PATENT DOCUMENTS

3221328  9/1991  Japan ..................... 29/281.5

*Primary Examiner*—P. W. Echols

[57] ABSTRACT

The present invention relates to a method and apparatus for making an elastomeric spring assembly comprised of first and second plates joined to opposite sides of an annular elastomeric spring member. The preferred method of the present invention includes the steps of arranging the first and second plates in spaced and aligned relation relative to each other; laying a preformed annular elastomeric spring member between the spaced plates; positioning the spring member at a predetermined location relative to the plates as with a powered apparatus movable intermediate the plates between a first position whereat the apparatus engages and positions the spring member relative to the plates and a second position whereat the apparatus is removed from between the plates; and, compressing the spring member between the plates with a force sufficient to establish a cold-formed interlock between the plates and the spring member. The present invention further discloses a press apparatus capable of making an elastomeric spring assembly according to the method of the present invention.

12 Claims, 4 Drawing Sheets

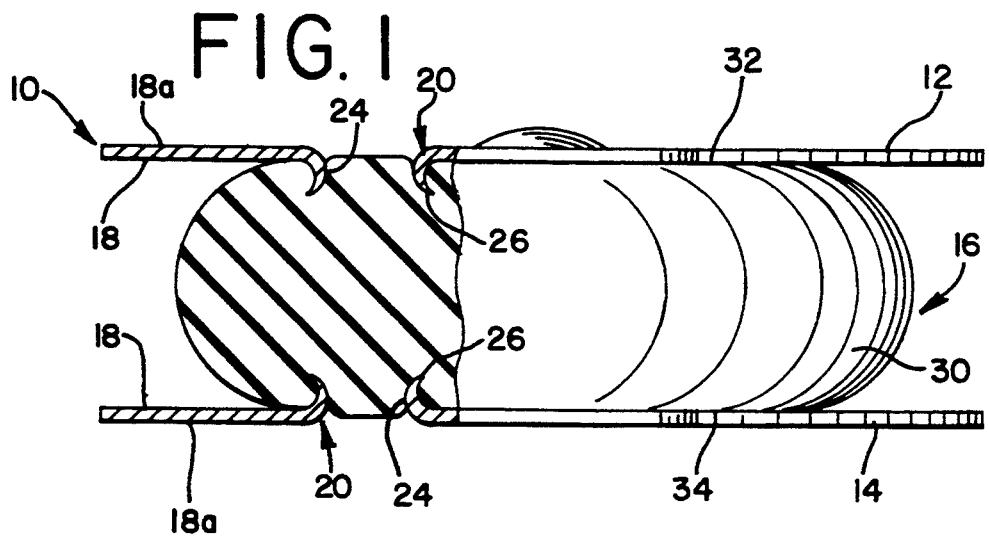
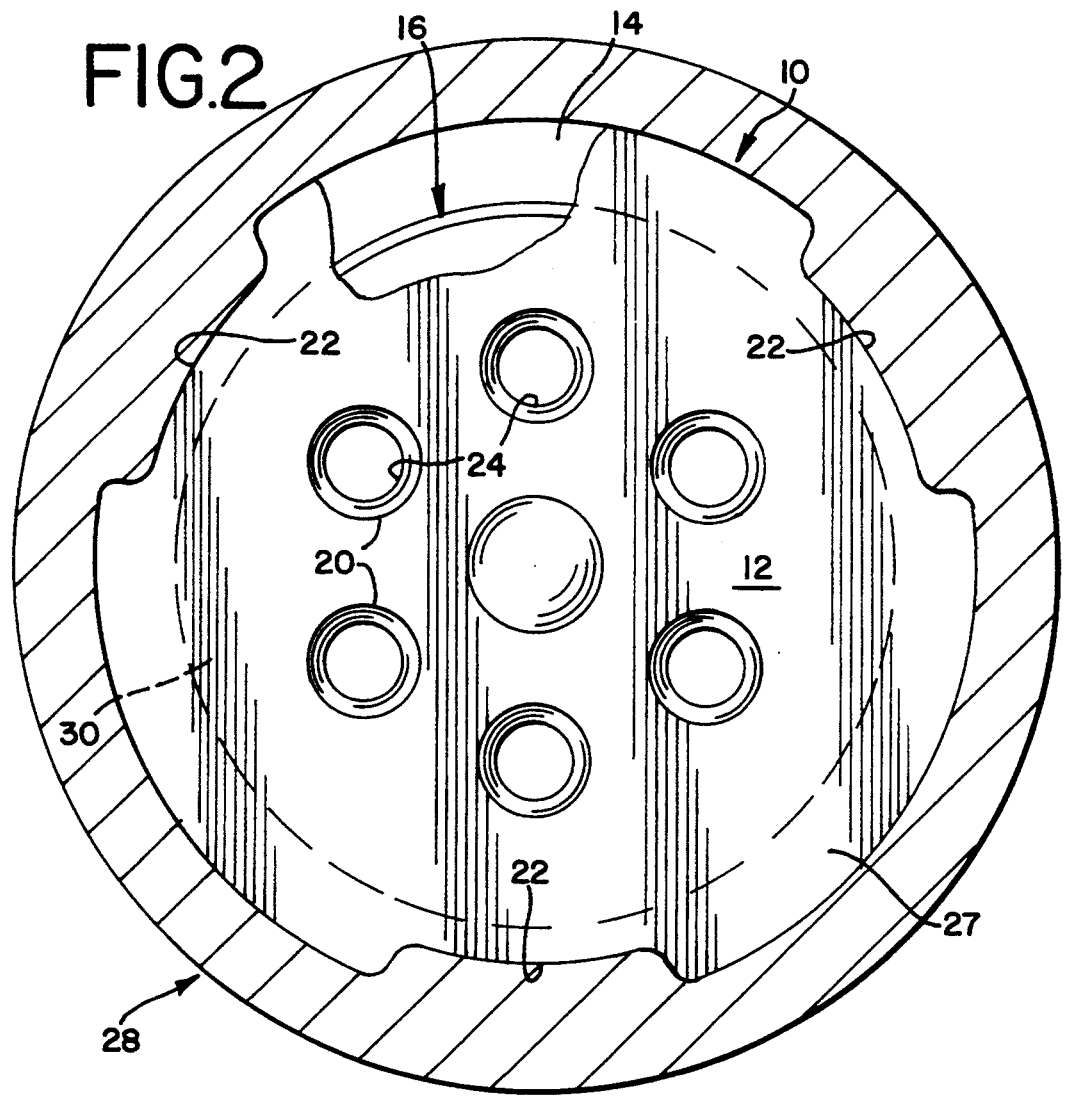

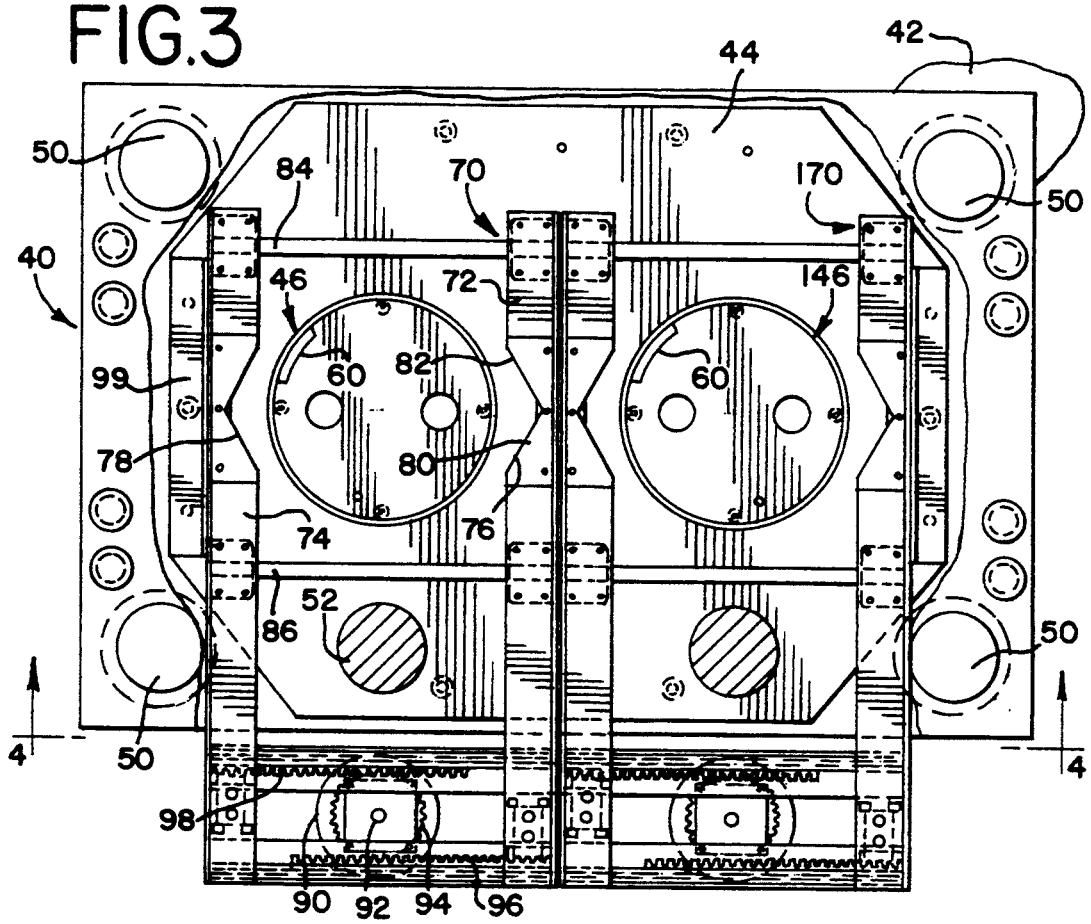
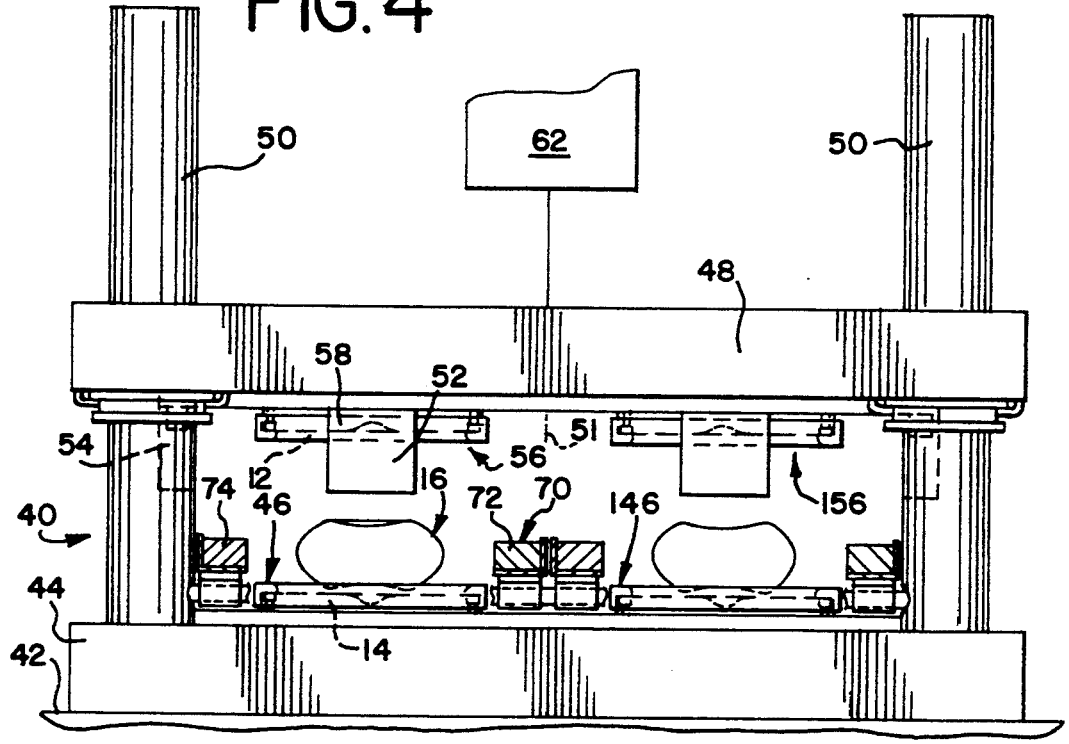

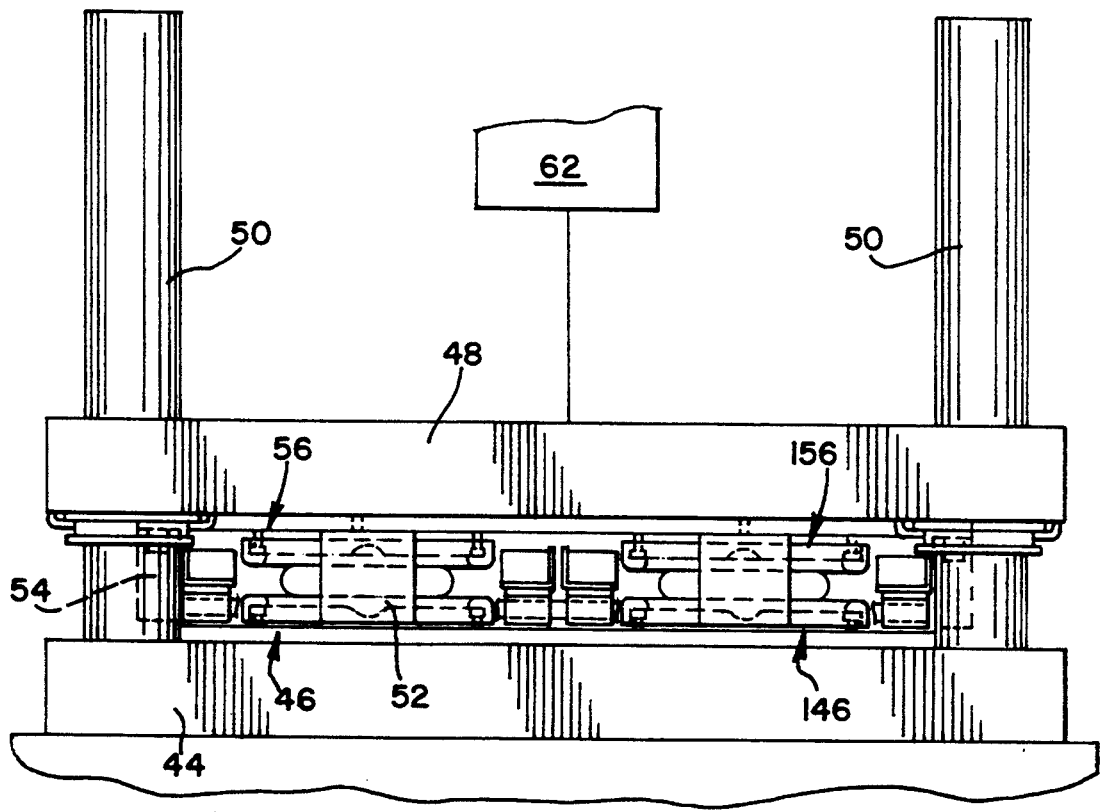
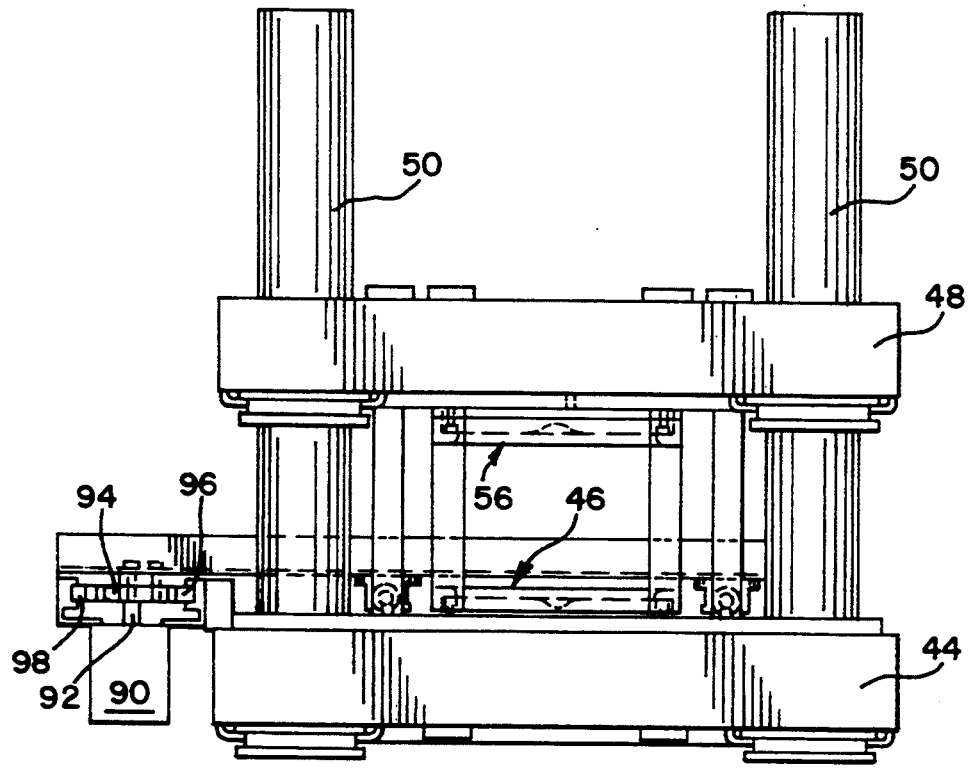

METHOD FOR MAKING AN ELASTOMERIC SPRING ASSEMBLY

FIELD OF THE INVENTION

The present invention generally relates to an elastomeric spring assembly or unit of the type used on rail cars and the like to absorb shock loads during coupling and other impacts between rail cars. More specifically, the present invention relates to a method for making an elastomeric spring assembly and an apparatus for accomplishing the proposed method.

BACKGROUND OF THE INVENTION

Draft gears for rail cars typically include a housing with a series of elastomeric spring assemblies or units arranged within the housing. The spring assemblies are arranged in stacked relation relative to each other to absorb shocks during coupling and other impacts between adjacent rail cars. The use and design selection of any particular spring unit is dependent upon the energy to be absorbed and the intended application of the spring.

Each elastomeric spring assembly typically includes an annular elastomeric spring member which is sandwiched between and joined to two metal plates. Each metal plate normally includes a surface incongruity which is intended to capture a portion of the elastomeric spring member that is forced into the incongruity during a cold-forming process, i.e., the direct application of pressure which causes the spring member elastomer to flow into the incongruities, thereby joining or bonding the plates to the spring member. The plates of a typical spring assembly typically include a profile about the periphery thereof. The plate profile is complementary to a design provided on the interior of the draft gear housing to promote sliding movement of the spring units within the draft gear housing thereby enabling the stacked spring units to combine in operation to absorb the very substantial impact loads applied to the rail cars during their movement and, more significantly, when the cars are being coupled into train consists.

With the spring assembly illustrated for purposes of this disclosure, it is imperative that the annular elastomeric spring member is properly and accurately located relative to the plates during assembly of the spring assembly. In the illustrated spring assembly, it is important that the elastomeric spring member is centered or arranged concentrically relative to the plates joined to opposite sides thereof.

As will be appreciated by those skilled in the art, when the elastomeric spring member is offset or not properly centered relative to the plates, the very substantial impact loads applied against the spring assembly, following its insertion into a draft gear housing, will cause unequal load distributions across opposing faces of the spring assembly. The uneven load distribution detracts from the effectiveness of the individual spring assemblies and thereby detracts from the ability of the draft gear to operate properly in absorbing the shock loading of the rail cars.

Besides those problems inherent with uneven load distribution, when the elastomeric spring member is not accurately located, the plates of the spring assembly have been known to shift from their normal parallel relationship and tend to diverge in relation to each other under the high loading applied thereto during operation of the draft gear. The divergence of the plates from their normal parallel relationship relative to each other causes the elastomeric spring member to be squeezed or pinched on one side of the spring assembly. Under the extremely high impact forces which are applied to the spring assembly during operation of the draft gear, this pinching or squeezing of the elastomeric spring often causes the elastomer of the spring member to extend beyond the periphery of the plates and scrape against the draft gear housing. As will be appreciated, this faulty condition requires repair and/or replacement of the elastomeric spring assembly and can further result in the need to repair or replace the draft gear housing.

Fabrication of an elastomeric spring assembly involves a labor intensive process. One well-known method of forming the spring assembly involves the use of a press capable of developing the high pressure necessary to effect the cold-formed interlock between the elastomeric spring member and the plates. During this process, one plate of the spring assembly is typically held in a first fixture while the second plate is typically held in a second fixture spaced from the first fixture. The annular elastomeric spring member is placed between the plates and the press is operated to apply the force necessary to effect a cold-formed interlock between the plates and the elastomer member and to provide a permanent compression set to the spring assembly or unit.

Various attempts have been proposed for properly and accurately arranging or locating the annular elastomeric spring member relative to the plates prior to the plates being compressed into relation with the spring member by the press. One attempt involves the press operator attempting to visually lay or locate the spring member in proper relation relative to the plates. This attempt has failed primarily due to human error. When the spring assembly is inaccurately assembled due to improper locating of the spring member relative to the plates, further labor efforts are required to disassemble the spring assembly. Because of the preset involved in the compression procedure, the spring member often cannot be readily reused. Thus, not only is there a loss of the labor costs incurred with improper fabrication of the spring assembly but material costs likewise increase from inaccurately manufactured spring assemblies.

An alternative proposal for fabricating the spring assembly involves using specifically sized annular locating rings for locating the elastomeric spring member relative to the plates of the spring assembly. Prior to the press being operated to compress the spring member and the plates into a spring assembly, the locating ring is snugly fit over the elastomeric spring member. After the locating ring and spring member are properly positioned relative to the plates, the locating ring is removed from about and over the spring member and the press is operated to form the spring assembly.

Serious drawbacks are associated with this later proposal. First, when the locating ring is removed, the annular spring member is often inadvertently displaced in view of the forces acting to remove the ring therefrom. Thus, the spring member is not properly centered and the labor intensive effort involved with centering the spring member is lost. Because the operator is normally unaware of the shifting of the annular spring member from its proper location, the press is operated and a faulty or non-acceptable spring assembly results.

Second, if improper positioning of the spring member is noticed, the operator needs to duplicate the effort and time including replacing the locating ring over the spring member to effect proper relocation of the spring member relative to the plates. Of course, the need to carefully separate the locating ring from the annular spring member (especially in those duplicative positioning situations) increases the labor intensive aspects of the spring assembly manufacturing process.

When the spring members are initially received at a press station they normally have a preformed annular configuration. As the spring members are retained in inventory, they have a tendency to change size. That is, both moisture and heat tend to alter the size of the preformed annular spring member. Depending on how long the preformed annular spring members have been held in inventory, different sized locating rings are required to fit over the various sizes of the annular spring member. Of course, if any of the locating rings are lost or misplaced, production of the elastomeric spring assembly can be adversely affected.

The use of specifically sized locating rings to accurately position the annular spring member relative to the plates of the spring assembly furthermore complicates the vertical spacing necessitated between the press fixtures which retain the plates in the press. Since the locating ring must be removed from about the elastomer spring member prior to operation of the press, there will be an attendant increase in the vertical space required to remove the locating ring from around and over the annular spring member without effecting inadvertent displacement of the annular spring member. Thus, the use of locating rings furthermore increases the necessary spacing requirement between the press fixtures and thereby reduces the number of tiers of spring assembly forming stations which can be incorporated into a single press.

Thus, there is a need and a desire for an improved method for making elastomeric spring assemblies. The need for an improved method likewise lends itself to a need and a desire for an improved apparatus capable of effecting an improved method of forming the elastomeric spring assembly.

SUMMARY OF THE INVENTION

In view of the above and in accordance with the present invention, there is provided a unique method of making an elastomeric spring assembly which is comprised of first and second plates arranged on opposite sides of an annular spring member formed of an elastomer which has a cold-formed interlocking relationship with the plate members. The method includes the steps of: arranging first and second plates used to form the spring assembly in general alignment relative to each other; laying an annular spring member formed of an elastomer having a molecular structure and a ratio of plastic strain to elastic strain that is greater than 1.5 to 1 between the plates; positioning the annular spring member at a predetermined location relative to the plates with a powered apparatus movable intermediate the plates between a first position whereat the apparatus engages and positions the spring member relative to said plates and a second position whereat said apparatus is removed from between said plates; and compressing the spring member between the plates with a force sufficient to establish the cold-formed interlock between the plates and the spring member.

In one form of the invention, the first plate has a profiled periphery and is arranged within a first press fixture. The second plate likewise has a profiled periphery which is substantially identical to the first plate and is arranged within a second press fixture such that the peripheral profiles of the plate are commonly oriented. In a preferred form of the invention, the method of forming the spring assembly further includes the step of providing each press fixture with a locating member which serves to coact with the plate periphery to orient the plate within the respective press fixture and relative to the other plate. The method according to the present invention further includes the step of holding at least one of the plates within its respective press fixture with a magnet thereby inhibiting inadvertent release of the plate from the fixture thereby facilitating vertical orientation of the press fixtures. The method according to the present invention may likewise include providing each fixture with a locating member which coacts with the plate periphery to orient the plate within the fixture.

To enhance the interlocking relationship between the spring member and the respective plates, the method according to the present invention preferably further includes the step of providing at least one of the plates with incongruities extending inwardly toward the spring member. During the compression procedure, which involves the direct application of high pressures to form the spring unit, the elastomer has a tendency to flow into the incongruities formed in the plate. Thus, a portion of the elastomer spring member is captured within the plate incongruities thereby enhancing the interlocking relationship therebetween. In a preferred form of the invention, the compressing step involves compressing the spring member by at least 30% of its original dimension so as to overcome the compression set characteristic of the elastomer and provide a relatively constant spring rate for the elastomer pad assembly.

A salient feature of the present invention concerns the step of accurately positioning the spring member at a predetermined location relative to the plates. In a preferred form of the invention, this positioning step involves the step of moving first and second rigid arms inwardly toward and into contact with the annular member thereby positioning the spring member at a predetermined location relative to the plate it was laid upon.

In the preferred form of the invention, the arms are configured to contact and center the annular spring member relative to the plates. In those embodiments wherein the spring member is to be centered relative to the plates, the arms of the powered apparatus are equidistantly movable relative to each other and relative to the centerline of the press fixtures used to releasably hold the plates of the spring assembly. The arms are preferably operated from a common power source for simultaneously moving the arms inwardly toward the spring member and relative to the plates. Because the arms of the powered apparatus move simultaneously inward, they serve to center the spring member relative to the plates regardless of the annular size of the spring member. Thus, the heretofore known problems with spring member size variations are eliminated.

The method according to the present invention involving accurately locating the spring member through use of a powered apparatus eliminates human error involved with positioning the annular elastomeric member relative to the plates. Eliminating the use of locating rings which need to be lifted over the spring member minimizes the vertical spacing required between the fixtures used to hold the plates in the press thus enhancing the capability of adding additional spring forming stations and tiers to the press.

Another aspect of the present invention relates to a press apparatus for making the elastomeric spring assembly. The press apparatus according to the present invention includes a press frame having a first press fixture mounted thereon for releasably receiving and holding a first plate of the spring assembly therewithin and a second press fixture for releasably receiving and holding the second plate of the spring assembly therewithin. The second press fixture is arranged in spaced alignment with the first press fixture, with the spacing between the press fixtures being sufficient to permit the elastomeric spring member to be positioned between and relative to the plates. A drive mechanism provided on the press moves at least one of the press fixtures relative to the other press fixture with a compressing force sufficient to form a cold-formed interlock between the plates and the spring member thereby forming the elastomeric spring assembly.

In the preferred form of the invention, a powered apparatus is mounted on the press frame for generally linear movement between the press fixtures for accurately locating the spring member relative to the plates. The powered apparatus for positioning the elastomeric spring member preferably comprises a pair of arms which are movable between the fixtures and are powered from a common power source for simultaneously moving the arms relative to each other. Each arm is preferably configured to at least partially encircle the annular elastomeric spring member. In a preferred form of the invention, the arms of the powered apparatus are simultaneously movable relative to a centerline of the press fixtures to effect centering of the annular elastomeric member relative to the plates. The powered apparatus of the present invention may further include guide rods mounted on the press frame for guiding the arms for reciprocal movement relative to each other.

In a most preferred form of the invention, third and fourth press fixtures are mounted on the press frame laterally adjacent to the first and second press fixtures. The third and fourth press fixtures are provided to receive and releasably hold plates of a second elastomeric spring assembly therewithin. A second powered apparatus is mounted on the press frame for movement between the third and fourth fixtures for locating an elastomeric spring member of the second spring assembly relative to the third and fourth plates. The same drive mechanism used to compress the plates of the first spring assembly is used to compress the plates and spring member relative to each other thereby forming a second elastomeric spring assembly simultaneously with the first elastomeric spring assembly.

Besides eliminating operator error, the arms of the powered apparatus may be configured to locate the elastomeric spring member relative to the plates as desired. That is, the arms may be configured or shimmed to purposefully offset the spring member relative to the plates as called for in a particular spring assembly design. The spacing between the fixtures in the press need only provide room for sliding or otherwise positioning the preformed annular spring member between the plates thus minimizing the vertical distance between the press fixtures. As will be appreciated, minimizing the distance between the press fixtures enhances the number of spring assembly forming stations that can be provided on a press. The production advantages of adding additional spring assembly forming stations on a single press are readily apparent.

Numerous other features and advantages of the present invention will become readily apparent from the following detailed description, the accompanying drawings, and the appended claims.

DETAILED DESCRIPTION OF THE DRAWINGS

FIG. 1 is an elevational view, partly in section, of an elastomeric spring assembly made in accordance with the teachings of the present invention;

FIG. 2 is a plan view of an elastomeric spring assembly made in accordance with the teachings of the present invention and arranged within a draft gear housing shown in section;

FIG. 3 is a plan view of a press apparatus with parts being broken away to better illustrate details of the present invention used in making the elastomeric spring assembly illustrated in FIG. 1;

FIG. 4 is a rear elevational view of the press apparatus in an open position and taken along line 4—4 of FIG. 3;

FIG. 5 is a rear elevational view similar to FIG. 4 illustrating the press apparatus in a closed position;

FIG. 6 is a right side elevational view of the press apparatus in an open position.

DETAILED DESCRIPTION OF A PREFERRED EMBODIMENT

Figure 7:
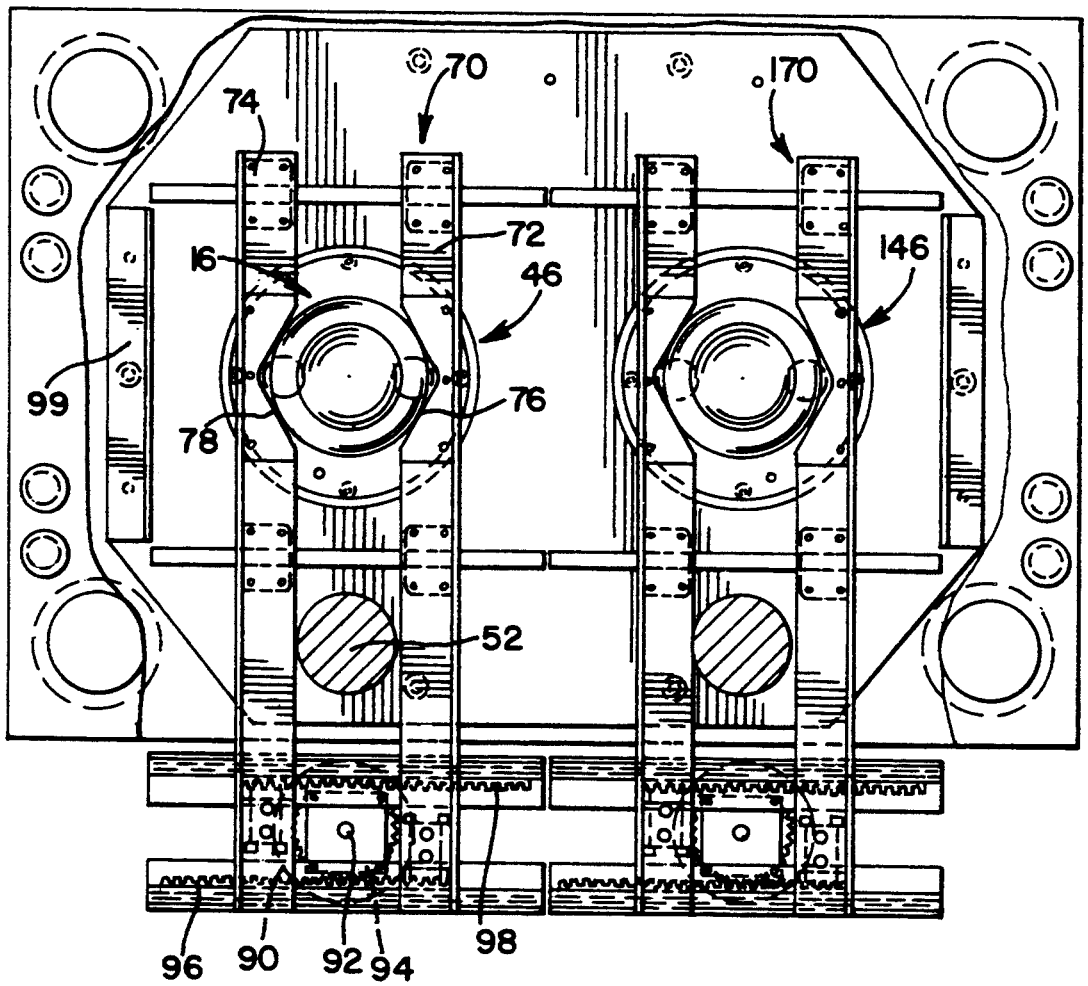
FIG. 7 is a top plan view similar to FIG. 3 showing a powered apparatus of the present invention in position to accurately locate and position an annular spring member of the elastomeric spring assembly illustrated in FIG. 1.

While the present invention is susceptible of embodiment in various forms, there is shown in the drawing a preferred embodiment of the invention which is hereinafter described, with the understanding that the disclosure which is presented is to be considered an exemplification of the present invention and is not intended to limit the invention to the specific embodiment illustrated.

Referring now to the drawings, wherein like reference numerals refer to like parts throughout the several views, there is shown in FIG. 1 an elastomeric spring unit or assembly 10. The elastomeric spring unit 10 is comprised of first and second plates 12 and 14, respectively, which are arranged on opposite sides of an annular elastomeric spring member 16.

The plates 12, 14 of spring assembly 10 are substantially similar to each other. Each plate 12, 14 is preferably fabricated from a low-carbon, hot-rolled steel per ASTM 569 and has a minimum hardness of Rockwell 45B. To further reduce costs and to facilitate their fabrication as by a conventional stamping process, each plate 12, 14 has an overall planar configuration defined by inner and outer generally parallel major surfaces 18 and 18a, respectively, with a profiled peripheral configuration extending about the circumference of each plate. In the illustrated embodiment, the profiled peripheral configuration of each plate includes a plurality of equally spaced substantially identical reliefs 22. When assembled, the reliefs 22 extending about the circumference of plate 12 align with the reliefs 22 provided about the circumference of plate 14.

For purposes to be discussed in greater detail below, each metal plate 12, 14 is provided with a series of incongruities 20 preferably spaced at a common distance or radius from the center of a respective plate. In the illustrated embodiment, the incongruities are formed by an aperture 24 having a crown-shaped and preferably pointed lip 26 extending about the periphery of each aperture and extending away from an inner surface 18 of each respective plate to engage the spring member 16.

As shown in FIG. 2, the profiled configuration of the plates facilitate assembly of the pad unit 10 into a central opening 27 provided on a draft gear housing 28. As shown, the central opening 27 on draft gear housing 28 has a profiled cross-sectional configuration which is complementary to that extending about the circumference of the plates 12, 14. Thus, when the pad assemblies are stacked within the opening 27 of the draft gear housing 28, the reliefs 22 on the plates promote sliding movement of the spring assembly within the gear housing 28 to absorb the very substantial impact forces that are imposed upon the rail cars during their movement, and, more significantly, when the cars are being coupled into train consists.

Each pad assembly or unit 10 further includes a preformed elastomer which forms the spring member 16 of the unit 10. As shown on FIG. 1, the preformed elastomer forming spring member 16 has a generally annular configuration with opposed, generally flat first and second surfaces 32 and 34.

The spring member 16 is molded of an elastomer that is very durable, inert to reaction with grime, salt and corrosive fluids, not subject to tear propagation, has tensile characteristics such that the ratio of plastic strain to elastic strain is greater than 1.5 to 1, and when bonded to a metal plate as set forth herein, will form a lasting, durable bond that far exceeds the needs of even the demanding rail car industry. One such elastomer is the copolyester polymer that is sold by E. I. DuPont de Nemoirs under the trademark Hytrel ®. Such elastomers are well known in the industry and are more fully described in U.S. Pat. No. 4,198,037 to Anderson as well as U.S. Pat. Nos. 3,763,109; 3,766,146; and 3,651,014. While the DuPont Company does provide this material under different composition numbers to reflect some minor variations in properties such as hardness, each will be suitable and a preference for any one of the compositions will be dependent upon the weight of the rail cars, the amount of energy to be absorbed, and factors related to the intended or specific application. A Hytrel ® type 5556 is preferred and is found to be well suited. The preformed shape of the elastomeric spring member can be successfully molded by any of several techniques including melt casting, injection molding, and other techniques recommended by the DuPont Company and well known in the molding industry.

Having set forth one example of the product which is typically used in industry, what follows is a detailed description of a preferred apparatus suited for making the product. The plates 12, 14 and preformed elastomer spring member 16 are formed into an elastomeric spring assembly in a hydraulic, mechanical or other form of press 40 in the manner depicted in FIGS. 3 through 7.

The press 40 is capable of developing a relatively high compressive force and, as shown in FIG. 3, includes a stationary frame 42 having a fixed die shoe or plate 44 to which is mounted a first or lower die or press fixture 46 for releasably receiving and releasably holding plate 14 (FIG. 4). Notably, plate 14 is releasably fitted within fixture 46 such that the crown-like projections 26 (FIG. 1) on plate 14 extend upwardly away from the fixture 46.

As shown in FIG. 4, press 40 further includes an upper die shoe or plate 48. The upper die shoe 48 is mounted for vertical reciprocation on suitable guideposts 50 for movement along a predetermined path of travel 51 extending toward and away from the lower die shoe or plate 44. For purposes to be described hereinafter, the upper die shoe 48 is provided with mechanical stops 52 and 54 which are positioned to engage the lower die shoe 44 and thereby limit the movement of the upper die shoe 48 toward the lower die shoe 44.

The upper die shoe 48 is further provided with a second die or press fixture 56 for releasably receiving and holding plate 12. Notably, plate 12 is releasably fitted within fixture 56 such that the crown-like projections 26 (FIG. 1) on plate 12 extend downwardly and away from the fixture 56. The second press fixture 56 is provided on the second die shoe in alignment with the first press fixture 46.

As shown in FIG. 3, the upper fixture 56 is provided with one or more magnets 58. The magnet 58 is arranged to releasably hold and inhibit inadvertent release of plate 12 from the fixture 56, thereby facilitating vertical orientation of the fixtures 46 and 56 within press 40. Alternative mechanisms such as mechanical detents or the like for releasably holding the plate 12 within fixture 56 in vertically spaced relation relative to plate 14 in fixture 46 are likewise within the spirit and scope of the present invention.

The fixtures 46, 56 are furthermore provided with suitable devices for orienting the plates 14, 12 within their respective fixtures. Only the plate orienting device associated with fixture 46 will be discussed in detail with the understanding that fixture 56 is similarly constructed. As shown in FIG. 3, each press fixture is provided with a locating apparatus 60 which coacts with the plate periphery to orient the plate within the respective fixture. In the preferred embodiment, the locating apparatus 60 is configured to fit within and snugly engage the confines of one of the reliefs 22 provided about the periphery of each plate. A similar orientation of the locating apparatus 60 between the fixtures 46 and 56 thereby ensures that the reliefs 22 on the plates 12 and 14 will be aligned relative to each other upon formation of the elastomeric spring assembly.

Turning again to FIG. 4, fixture 56 is vertically spaced from fixture 46 by a distance which is greater than the thickness of the preformed elastomeric spring member 16. Thus, the press operator is provided with sufficient space between the fixtures 46 and 56 and the plates 14 and 12, respectively and releasably held thereby, to lay and permit shifting movement of the preformed spring member 16 between the plates 12 and 14.

To form the elastomeric spring unit or assembly 10, a compressive force derived from a conventional drive mechanism or ram 62 on the press 40 is applied to the upper die 48, thereby compressing the preformed elastomeric spring member 16 and plates 12 and 14 between the fixtures 56 and 46, respectively. Preferably the preformed elastomeric spring member 16 is compressed by at least 30% and, preferably, by more than 50% of its original height.

As shown in FIG. 5, the drive mechanism 62 moves the upper die 48 toward the lower die 46 until the limit stops 52, 54 engage the lower die plate 44. The compressive force is applied to the assembly for several seconds, and upon release, the upper die plate 48 will return to a position such as that illustrated in FIG. 4. The compression of the elastomeric spring member 16 between the plates 12 and 14 accomplishes two important functions. The first important function is that of causing the elastomeric spring member 16 to take a permanent compression set and of orienting the molecular structure of the elastomer. As explained in the above-identified Anderson patent, the elastomeric spring member will take this "set" and thereafter will act as an effective compression spring, i.e. upon subsequent applications of force, the elastomeric spring member 16 will always return to its original height.

The second important function achieved by compressing the elastomeric spring member 16 between the plates 12 and 14 is to establish a cold-formed interlock between the plates 12, 14 and the spring member 16. Returning to FIG. 1, the compression of the elastomeric member 16 between the plates 12 and 14 has the effect of causing the elastomer of spring member 16 to establish a cold-formed interlock between the incongruities 20 on the plates and the spring member 16. The cold-formed interlock established between the elastomeric spring member 16 and the plates 12, 14 forms a mechanical bond which inhibits separation of the spring member 16 from the plates 12, 14 during operation of the draft gear housing.

After a predetermined period of time the upper die plate 48 is returned to its starting position and the elastomeric spring assembly formed by the compressive action of the fixtures 46 and 56 is complete. Thereafter, the spring assembly might be stacked and inserted into the central opening 27 of the draft gear housing 28 (FIG. 1) or other intended applications.

A salient feature of the present invention concerns a powered apparatus 70 mounted on the press frame 42 for accurately positioning the annular spring member 16 at a predetermined location relative to the plates 12, 14 prior to the application of the compressive force to form the spring assembly or unit. In the illustrated embodiment, the purpose of the powered apparatus 70 is to center the preformed annular spring member 16 relative to the plates 12 and 14. It should be appreciated, however, that if an offset of the spring member 16 relative to the plates 12, 14 is preferred, slight redesign efforts of the powered apparatus 70 will readily permit such ends to be accomplished.

Turning again to FIGS. 3 and 4, a preferred embodiment of the powered apparatus 70 comprises a pair of elongated and rigid arms 72 and 74 mounted on the press frame 42 for movement between the spaced and aligned fixtures 46 and 56. The arms 72, 74 are mounted for movement along a predetermined path of travel extending generally normal to the path of travel 51 of the press fixture 56. As shown, arm 72 is arranged to one side of the vertical reciprocatory path of movement 51 of fixture 56, while arm 74 is arranged to an opposite side of the vertical reciprocatory path of movement 51 of the fixture 56.

In the illustrated embodiment, the arms 72 and 74 are reciprocally movable toward and away from each other between first and second positions. In one position (FIG. 7) the powered apparatus 70 is positioned to accurately locate the spring member relative to the plates 12 and 14 releasably held in the fixtures 46 and 56. In a second position (FIG. 3), the powered apparatus 70 is positioned outwardly of the path of the fixtures 46 and 56 so as to not interfere with formation of the elastomeric spring assembly 10 resulting from compression of the plates 12, 14 against the elastomeric spring member 16.

As shown in FIG. 7, each of the arms 72 and 74 are preferably configured to at least partially encircle the annular spring member 16, thereby asserting a camming action against the annular spring member 16 to effect accurate positioning of the member 16 relative to the plates 12 and 14. In the illustrated embodiment, the arms 72, 74 are provided with laterally aligned generally V-shaped configurations 76 and 78, respectively. In the illustrated embodiment each configuration 76, 78 is centered on the centerline of fixture 46.

Since the configurations 76, 78 of the preferred embodiment are substantially identical, only a detailed description of configuration 76 need be provided. As illustrated in FIG. 3, each configuration is defined by first and second angularly diverging and vertically disposed surfaces 80 and 82. As will be appreciated, as the arms 72, 74 move inwardly, the surfaces 80, 82 on the respective configurations will position and orient the spring member 16 into a centered relationship relative to the aligned plates 12 and 14. It is well within the scope of the present invention, however, to provide shims or the like on either of the surfaces 80, 82 of either arm 72, 74 to thereby locate the spring member to establish other than a centered position relative to the plates 12 and 14.

A preferred form of the powered apparatus 70 further includes generally horizontal guide bars 84 and 86, along which the arms 72, 74 of the powered apparatus 70 reciprocally move. Opposite ends of each guide rod 84, 86 are fixedly supported by the press frame 42 as by any conventional structure.

In the illustrated embodiment, the powered apparatus 70 preferably includes a common source of power 88 for effecting simultaneous movement of the arms 72 and 74. It should be appreciated, however, that it is well within the scope of the present invention to provide independent sources of power for each of the arms 72, 74 if so desired. As shown in FIGS. 3, 6 and 7, the source of power for the powered apparatus 70 includes a rack and pinion arrangement. More specifically, the powered apparatus 70 includes a load sensitive preferably pneumatically operated motor 90 which is mounted on a frame assembly 92 connected to the press frame 42. As shown, motor 90 includes a rotatable output shaft 92 arranged in axial alignment with the centerline of the press fixture 46 and has a pinion 94 which rotates in response to operation of the motor 90. The pinion 94 engages with a pair of racks 96 and 98 supported for sliding movement along the frame assembly 92. In the illustrated embodiment, rack 96 is connected to arm 72, while rack 98 is connected to arm 74.

Upon actuation of the motor 90, the pinion 94 rotates thereby causing linear displacement of the racks 96 and 98. When operated in one direction, the motor 90 causes the arms 72 and 74 to simultaneously move inwardly toward each other, thereby locating the annular spring member 16 relative to the plates 12, 14 of the spring unit. The arms will continue to move inwardly toward each other, thereby sliding the elastomeric spring member 16 across surface 18 of the bottom plate 14 (FIG. 1) until the arms 72, 74 are inhibited from further movement. After accurately locating the spring member 16 relative to the plates 12, 14, the operation of the motor 90 is reversed, thereby moving the arms 72 and 74 outwardly beyond the path of movement of the fixture 46 so as to not interfere with the compression of the plates 12, 14 and the spring member 16. Retraction of the arms 72 and 74 continues until one arm abuts against a preset stop 99 provided on the press frame. After the arms 72 and 74 are moved beyond the path of movement of the fixture 46, the press 40 is actuated to compress and form the elastomeric assembly in the manner discussed above.

To enhance productivity and to maximize efficiency of the press 40, third and fourth press fixtures 146 and 156 may be provided on the press frame 42 adjacent to the press fixtures 46 and 56. The third and fourth press or die fixtures 146 and 156 are substantially similar to the fixtures 46 and 56 discussed above. A second power assembly 170 is mounted on the press frame and is substantially similar in construction and operation to the power assembly 70 discussed above.

As will be appreciated, the provision of third and fourth fixtures 146 and 156 allows for a simultaneous production of two elastomeric spring assemblies upon one stroke of the press. Moreover, it is well within the scope of the present invention to provide a second tier to the press above or below that shown, thus enabling third and fourth elastomeric spring assemblies to be produced simultaneously with the first and second elastomeric spring assemblies.

Another aspect of the present invention relates to the method of making an elastomeric spring assembly. The preferred method comprises the steps of arranging first and second plates 12 and 14, respectively, in general alignment relative to each other; laying an annular spring member 16 formed of an elastomer having a molecular structure and a ratio of plastic strain to elastic strain that is greater than 1.5 to 1 between the plates 12 and 14; positioning the annular spring member 16 at a predetermined location relative to the plates 12, 14 with a powered apparatus 70 movable intermediate the plates 12, 14 between a first position whereat the apparatus 70 engages and positions the spring member 16 relative to the plates 12, 14 and a second position whereat the apparatus 70 is removed from between the plates 12, 14; and compressing the spring member 16 between the plates 12, 14 with a force sufficient to establish a cold-formed interlock between the plates 12, 14 and the spring member 16.

The method of making an elastomeric spring assembly may further comprise the step of locating the first plate 12 having a profiled periphery within a first press fixture 56; and locating the second plate 14 having a profiled periphery substantially identical to the first plate within a second press fixture 46 such that the peripheral profiles of the plates are commonly oriented. The preferred method further includes the step of releasably holding plate 12 within press fixture 56 with a magnet 58, thereby inhibiting inadvertent release of the plate 12 from the press fixture 56. To allow the profiled peripheries of the plates 12, 14 to be in alignment, the method of the present invention further includes the step of providing each press fixture with a suitable locating device 60 which coacts with the plate periphery to orient that plate within the fixture.

In the preferred method of the present invention, the process step of compressing the plates and the elastomeric member involves compressing the spring member by at least 30% of its original dimension. Compressing the spring member by at least 30% overcomes the compression set characteristic of the preformed annular elastomeric spring and provides a relatively constant spring rate for the elastomeric spring assembly.

One distinct advantage of the present invention is the use of a common power source for moving arms 72 and 74 of the powered apparatus simultaneously inward at equal distances relative to each other to center the annular spring member 16 relative to the plates 12 and 14 prior to formation of the spring unit or assembly. Another important advantage of the present invention is that after the annular spring member 16 is accurately positioned by sliding the spring member into a predetermined position relative to the plates 12 and 14, no further forces are imparted thereto which would result in inadvertent shifting of the spring member 16 relative to the plates 12 and 14 prior to actuation of the press. That is, after sliding the annular spring member 16 into position, the powered assembly is reversed and compression of the plates 12, 14 against the preformed elastomeric spring may commence without operator error being involved during the production of the spring assembly.

The powered apparatus 70 for positioning the elastomeric member 16 relative to the plates 12, 14 provides still a further advantage. While providing accurate positioning of the preformed spring relative to the plates, the powered apparatus 70 takes up a minimal amount of space between the fixtures 46 and 56. Thus, only a minimal amount of space need be provided between the fixtures 46 and 56 to allow the operator to insert the elastomer spring member between the plates 12 and 14 prior to operation of the press. Minimizing the vertical space constraints between the first and second press fixtures 46 and 56, enhances the production capacity of the press by providing additional space between the press driver and the press fixtures whereby an additional tier or level of fixtures could be provided in vertical spaced relation to those shown thus further enhancing the productivity of the press producing elastomeric spring assemblies.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A method of making an elastomeric spring assembly comprising the steps of:

locating a first plate having a profiled periphery within a first fixture;

locating a second plate having a profiled periphery substantially identical to that on the first plate within a second fixture such that the peripheral profiles of said plates are commonly oriented;

laying an annular spring member formed of an elastomer having a ratio of plastic strain to elastic strain that is greater than 1.5 to 1 upon one of said plates;

moving first and second arms along a predetermined path of movement inwardly toward and into contact with said annular member thereby positioning said spring member at a predetermined location relative to the plate it was laid upon; and compressing said spring member between said plates with a force sufficient to establish a cold-formed interlock between said plates and the spring member and thereby forming said spring assembly.

2. The method of making an elastomeric spring assembly according to claim 1 including the further step of holding at least one of said plates within its respective fixture with a magnet thereby inhibiting inadvertent releasement of the plate from the fixture thereby facilitating vertical orientation of the fixtures within a press.

3. The method of making an elastomeric spring assembly according to claim 1 including the further step of orienting the plates within their respective fixtures such that the profiled periphery of the plates are generally aligned relative to each other.

4. The method of making an elastomeric spring assembly according to claim 1 wherein the compressing step involves compressing said spring member by at least 30% of its original dimension so as to overcome the compression set characteristic of the elastomer and provide a relatively constant spring rate for the elastomeric pad assembly.

5. The method of making an elastomeric spring assembly according to claim 1 wherein the step of moving the first and second arms involves moving the arms inwardly an equal distance to center the annular spring member relative to the plates.

6. The method of making an elastomeric spring assembly according to claim 1 comprising the further step of providing a common power source for moving the arms equidistantly inwardly toward said spring member.

7. The method of making an elastomeric spring assembly according to claim 1 including the further step of providing a rack and pinion drive assembly for moving the arms equidistantly inwardly so as to center the spring member relative to the plates.

8. A method of making an elastomeric spring assembly comprising the steps of:

arranging first and second plates in general alignment relative to each other;

laying an annual spring member formed of an elastomer having a ratio of plastic strain to elastic strain that is greater than 1.5 to 1 between said plates;

positioning said annular spring member at a predetermined location relative to said plates with a powered apparatus movable intermediate said plate between a first position whereat said apparatus engages and positions said spring member relative to said plates and a second position whereat said apparatus is removed from between said plates; and compressing said spring member between said plates with a force sufficient to establish a cold-formed interlock between said plates and said spring member.

9. The method of forming an elastomeric spring assembly according to claim 8 including the further step of providing at least one of said plates with a projection extending inwardly toward said spring member to enhance the interlocking relationship between the spring member and the respective plate.

10. The method of making a elastomeric spring assembly according to claim 8 including the further step of arranging the first and second plates within first and second press fixtures, respectively, with said press fixtures being arranged in vertical alignment relative to each other so as to permit said spring member to be laid on and slid along a top surface of one of said plates.

11. The method of making an elastomeric spring assembly according to claim 8 wherein said powered apparatus comprises a pair of arms which are configured to contact and center the annular spring member relative to the plates.

12. The method of making an elastomeric spring assembly according to claim 11 wherein said powered apparatus further includes a source of common power for simultaneously moving the arms inwardly toward the spring member and relative to said plates.

* * * * *